UNITED STATES PATENT OFFICE.

WALLACE APPLETON BEATTY, OF NEW YORK, N. Y., ASSIGNOR, BY DIRECT AND MESNE ASSIGNMENTS, TO GEORGE W. BEADLE, OF NEW YORK, N. Y.

VARNISH.

1,113,926.   Specification of Letters Patent.   Patented Oct. 13, 1914.

No Drawing.   Application filed January 3, 1913. Serial No. 740,075.

*To all whom it may concern:*

Be it known that I, WALLACE APPLETON BEATTY, a citizen of the United States, residing at New York city, in the county of New York and State of New York, have invented certain new and useful Improvements in Varnishes; and I do hereby declare the following to be a full, clear, and exact description of the invention, such as will enable others skilled in the art to which it appertains to make and use the same.

This invention relates to varnishes for general uses, and especially adapted for furniture, pianos, etc., and has for its object to produce a varnish which will be transparent, will possess a high polish, will be absolutely water and moisture resisting, will also be very highly resistant toward heat, will be insoluble in chemicals in general, and will therefore be more efficient in use than those heretofore proposed.

To these ends the invention consists in a novel varnish made from a novel gum, more fully hereinafter disclosed and particularly pointed out in the claims.

In order that the invention may be more clearly understood, it is said:—In my prior application #702,046, filed June 6, 1912, entitled artificial gums and process of producing the same, I have disclosed and claimed a new gum and method of making it, which method, when briefly stated, consists in forming a product from a mixture of acetone and phenol to which is added a small quantity of acid, in order to produce what I believe to be dioxy diphenyl dimethyl methane. This product is then further acted upon, as stated in said application above, by formaldehyde, in order to produce a tenacious product constituting the said new gum above mentioned. This new gum is found to be inodorous, insoluble in water, is relatively strong and tenacious, and it may be colored with dyes, or with other substances. The gum produced as above is also soluble in alcohol, ether, acetone, glacial acetic acid, amyl alcohol, amyl acetate and acetylene tetra-chlorid, or mixtures of them. It is, however, insoluble in oils, such as linseed oil, turpentine, and mineral oils. I find further that this new gum when first produced is more or less soluble in alkali, that it becomes less and less soluble at say 100°, until when it has been kept at that temperature for say two hours it is scarcely soluble at all even in strong alkali. When brought to this condition, however, acids will convert it at ordinary temperatures into a mass which is insoluble in alkali. I have further found that when the gum is dissolved, in one of the solvents disclosed above, if sufficient acid is added to give it an acid reaction, the varnish produced will harden at ordinary temperatures into an insoluble mass the same as if it had been heated to the temperatures mentioned. I have also further found that the more acid the varnish is rendered, the quicker will it dry. When in its insoluble condition, it is an inodorous transparent mass, quite strong, non-brittle and tenacious. It is also very hard, and will not burn unless kept continually in a flame. In this condition of the gum, I have not found any solvent for it. The above properties are also possessed by the varnish to be disclosed below, when in its dried condition. Accordingly, in making my varnish out of this gum, I preferably dissolve the same in a suitable solvent to the proper consistency, preferring alcohol, or amyl alcohol, or mixtures of toluene and alcohol, according to the purpose to which the varnish is to be applied. The solvent action is, of course, facilitated by gentle heating.

When the gum is not acid and has been dissolved to the proper consistency, the varnish is ready for use, if it is intended to heat the same later in order to render it insoluble. On the other hand, if it is intended to render it insoluble without heating, the gum is acidulated to the proper degree after solution, according to the celerity with which it is desired to have the varnish dry. The acidulation of the varnish is very useful for a variety of purposes; for instance, when it is to be applied to fine grades of furniture, or to other articles which it is either not convenient, or is injurious to heat.

It is an important feature of my invention that I am thus enabled to make a varnish which is self-drying at ordinary temperatures, which is substantially chemically inert to all reagents, which is insoluble in liquids in general, is non-inflammable, possesses a hard surface, and is inodorous.

It is obvious that various substances can be mixed with my varnish to give it different properties, or characteristics, such, for example, as coloring matter and dyes, as well as my dioxy diphenyl dimethyl methane. And it is further obvious that other compounds may be employed to produce my novel gum, as is stated in my application above, for example, the homologues of acetone and phenol, such as methyl-ethyl ketone, or diethyl ketone, and cresol. Of course, when these compounds are employed gums which are similar, both chemically and physically, to the gums above employed are produced, and the varnishes made therefrom correspondingly vary as would be expected by those skilled in this art.

Accordingly, it is obvious that those skilled in the art may vary the properties of my varnish without departing from the spirit of my invention, and therefore I do not wish to be limited to the above disclosure except as may be required by the claims.

What I claim is:—

1. The herein described new varnish containing a condensation product of a ketone, a phenol and an aldehyde in the form of a gum dissolved in a solvent.

2. The herein described new varnish having an acid reaction containing a condensation product of a ketone, a phenol and an aldehyde in the form of a gum dissolved in a solvent.

3. The herein described new varnish composed of a condensation product of acetone, phenol and formaldehyde and a solvent.

4. The herein described new varnish having an acid reaction and composed of a condensation product of acetone, phenol and formaldehyde and a solvent.

5. The herein described new varnish composed essentially of a condensation product of a ketone, a phenol and an aldehyde in the form of a gum dissolved in a hydrocarbon, substantially as described.

In testimony whereof, I affix my signature, in presence of two witnesses.

WALLACE APPLETON BEATTY.

Witnesses:
   T. A. WITHERSPOON,
   R. M. PARKER.